(12) United States Patent
Chawla et al.

(10) Patent No.: US 6,646,080 B2
(45) Date of Patent: Nov. 11, 2003

(54) COATING COMPOSITIONS FOR PLASTIC SUBSTRATES

(75) Inventors: Chandler P. Chawla, Batavia, IL (US); Christopher Tronche, Schaumburg, IL (US)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 10/189,372

(22) Filed: Jul. 3, 2002

(65) Prior Publication Data

US 2003/0096928 A1 May 22, 2003

Related U.S. Application Data

(63) Continuation-in-part of application No. 09/951,777, filed on Sep. 14, 2001.
(60) Provisional application No. 60/232,427, filed on Sep. 14, 2000.

(51) Int. Cl.7 .............................................. C08F 130/04
(52) U.S. Cl. ........................ 526/240; 526/241; 526/279
(58) Field of Search ................................ 526/240, 241, 526/279

(56) References Cited

U.S. PATENT DOCUMENTS 6,160,067 A   12/2000   Eriyama et al.

FOREIGN PATENT DOCUMENTS

| EP | 0 867 469 | * | 9/1998 |
| WO | 97/12942 | | 4/1997 |
| WO | 00/47666 | | 8/2000 |
| WO | 01/12690 | | 2/2001 |
| WO | 02/22751 | | 3/2002 |

* cited by examiner

Primary Examiner—Bernard Lipman
(74) Attorney, Agent, or Firm—Pillsbury Winthrop LLP

(57) ABSTRACT

The present invention provides radiation-curable compositions for coating plastic substrates, wherein the compositions, after cure, have a combination of sufficient adhesion, flexibility, and hardness. The compositions include:

(a) metal oxide particles; and (b) a poly(meth)acrylate compound.

32 Claims, No Drawings

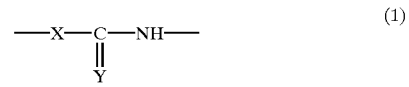

COATING COMPOSITIONS FOR PLASTIC SUBSTRATES

CROSS-REFERENCE TO RELATED APPLICATIONS

This application is a continuation-in-part of U.S. application Ser. No. 09/951,777, which was filed on Sep. 14, 2001, and claims the benefit of U.S. provisional application No. 60/232,427, filed Sep. 14, 2000. Both prior applications are hereby incorporated in their entirety by reference.

FIELD OF THE INVENTION

The present invention relates to radiation curable compositions, to coatings formed by curing these compositions, and to articles comprising such coatings. An aspect of the invention concerns the use of the present compositions to form protective coatings on substrates including for example display monitors (like flat screen computer and/or television monitors such as those utilizing technology discussed in, for example, U.S. Pat. Nos. 6,091,184 and 6,087,730 which are both hereby incorporated by reference), optical discs, touch screens, smart cards and the like.

BACKGROUND OF THE INVENTION

There is great interest in the development of plastic substrates for, for instance, LCD (liquid crystal display) and OLED (organic light emitting diode) display applications. Plastic substrates are light and tough, and comparatively easy to shape. However, plastics are typically relatively soft and, thus, there is the need to deposit a protective layer on the exposed surface of the plastic. Such protective layers are preferably relatively hard (to provide, e.g., scratch resistance) yet also substantially flexible. In addition, such layers should adhere well to the surface they are coated on.

SUMMARY OF THE INVENTION

The present invention provides compositions that, after cure, adhere well to plastic substrates and provide a flexible material having a hard, scratch resistant surface. The compositions comprise (i) metal oxide particles; and
(ii) a poly(meth)acrylate compound.

In one embodiment, the compositions are used to coat substrates for use in display applications.

DESCRIPTION OF THE INVENTION

It is to be understood that the term polynorbornene herein refers to a polymer wherein at least 10 wt %, relative to the total weight of the polymer, results from the polymerization of norbornene monomers, more preferably at least 50 wt %, even more preferably at least 80 wt %, and most preferably at least 95 wt % results from the polymerization of norbornene monomers. Polynorborene may be a random copolymer, a block copolymer, a homopolymer or a polymer resulting from three or more monomers. Examples of polynorbornenes are, for instance, described in U.S. Pat. Nos. 5,468,819; 5,569,730; 5,571,881; 5,677,405; 5,741,869; and RE 34,638; which six patents are hereby incorporated in their entirety by reference. "(Meth)acrylate" refers in this application to "acrylate and/or methacrylate".

The present invention includes compositions for coating a plastic substrate, wherein the compositions comprise a component (A) comprised of a metal oxide bonded to an organic compound, wherein the organic compound has (i) a radiation curable group; and
(ii) a group represented by the following formula (1)

$$—X—\underset{\underset{Y}{\|}}{C}—NH—\qquad(1)$$

wherein
X represents an amine (NH), oxygen (O), or sulfur (S) radical; and
Y represents an oxygen (O) or sulfur (S) radical.

Suitable examples of the component comprised of a metal oxide bonded to an organic compound are, for instance, set forth in U.S. Pat. No. 6,160,067 to Eriyama et al., which is hereby incorporated in its entirety by reference. Preferably, the metal oxide comprises at least one metal selected from the group consisting of silicon, aluminum, zirconium, titanium, zinc, germanium, indium, tin, antimony, and cerium. The organic group preferably comprises a radiation-curable group that is ethylenically unsaturated, for instance a (meth)acrylate group, preferably an acrylate group.

There are no specific limitations to the method for preparing the crosslinkable particles (A). Methods for preparing the particles are disclosed in, for instance, WO 00/47666, which is hereby incorporated in its entirety by reference. A method of reacting the above-mentioned specific organic compound and oxide particles can be given as an example:

Oxide particles ($A_1$) are known to have moisture on the surface of particles as adsorption water under usual storage conditions. In addition, components which react with a silanol group-forming compound such as a hydroxide, hydrate, or the like are presumed to be present at least on the surface of the oxide particles. Therefore, the crosslinkable particles (A) can be produced by mixing the silanol group-forming compound and oxide particles ($A_1$), and heating the mixture while stirring. It is preferable that the reaction be carried out in the presence of water to efficiently bind the silanol group-forming site possessed by the specific organic compound ($A_2$) and the oxide particle ($A_1$). However, water is not required when the specific organic compound ($A_2$) and (optionally) compound ($A_3$) possess silanol groups. Therefore, the crosslinkable particles (A) can be prepared for example by a method which includes at least the operation to blend the oxide particles ($A_1$), the specific organic compound ($A_2$) and (optionally) compound ($A_3$).

The crosslinkable particles may be prepared, for example, by a two step process. The first step involving hydrolyzing the compound ($A_2$) and bonding the hydrolyzed compound to oxide particles ($A_1$). And a second step of hydrolyzing the compound ($A_3$) and bonding the particles obtained in the first step to the hydrolyzed compound obtained from compound ($A_3$). Hydrolysis may be omitted, when the compound ($A_2$) and compound ($A_3$) are not silanol group-forming compounds, but silanol group-containing compounds.

First Step

The first step comprises reacting a mixture of oxide particles ($A_1$) and a solvent or oxide particles ($A_1$) dispersed in a solvent with the compound ($A_2$) to bond oxide particles ($A_1$) and the compound ($A_2$) (such bonded particles may be hereinafter referred to as "intermediate particles"). Specifically, the oxide particles ($A_1$), the compound ($A_2$), and water are blended under the following conditions to produce the intermediate particles.

Here, p-methoxyphenol for example, may be added as a thermal polymerization inhibitor. The same solvent as used as a dispersion medium for the solvent dispersion sol of the oxide particles ($A_1$) can be used as a solvent.

The temperature for the reaction may be between the temperature at which the solutes do not precipitates and the boiling point of the solvent, with the preferable temperature range being from 0 to 150° C.

There are no specific restrictions to the manner of stirring inasmuch as the mixture can be homogeneously mixed.

A reaction time within which the reaction is sufficiently completed, for example, from 5 minutes to 24 hours, and preferably from one hour to 8 hours, can be applied.

Second Step

The second step comprises reacting the intermediate particles produced in the first step and the compound ($A_3$), thereby obtaining crosslinkable particles in which the intermediate particles are bonded with the compound ($A_3$). Specifically, the intermediate particles, the compound ($A_3$), and water are mixed under the following conditions to produce crosslinkable particles.

The temperature for the reaction may be between the temperature at which the solutes do not precipitates and the boiling point of the solvent, with the preferable temperature range being from 0 to 150° C.

There are no specific restrictions to the manner of stirring inasmuch as the mixture can be homogeneously mixed.

A reaction time within which the reaction is sufficiently completed, for example, from 5 minutes to 24 hours, and preferably from one hour to 8 hours, can be applied.

The crosslinkable particles can be obtained by bonding the oxide particles ($A_1$), compound ($A_2$), and compound ($A_3$) through first and second steps in this manner.

As mentioned above, it is desirable to produce the crosslinkable particles by first treating with the compound ($A_2$), followed by a treatment with the compound ($A_3$).

Taking the case using silica particles as the oxide particles ($A_1$) as an example, both impaired storage stability and inferior coating surfaces are associated with dispersion stability of the crosslinkable particles in the composition. Because the compound ($A_2$) is relatively bulky, the treatment only with the compound ($A_2$) cannot completely restrain the silanol group on the surface of particles from condensing after the treatment. However, successive treatment with the compound ($A_3$) with a relatively small molecular size is presumed to effect a smooth bonding on the surface of the particles, whereby the remaining silanol groups can be reduced more efficiently, resulting in improved dispersion stability of particles.

If the treatment with the compound ($A_3$) is carried out simultaneously with or prior to the treatment with the compound ($A_2$), dispersion stability of particles may be impaired, which results in impaired storage stability of the coating material and an inferior coating film appearance.

The amount of each of the compound ($A_2$) and the compound ($A_3$) bonded to the oxide particles ($A_1$) is 0.01 wt % or more, preferably 0.1 wt % or more, and particularly preferably 1 wt % or more, in the crosslinkable particles. If the amount of either the compound ($A_2$) or the compound ($A_3$) bonded with the oxide particles ($A_1$) is less than 0.01 wt %, dispersibility of the crosslinkable particles in the composition may be insufficient, which may result in cured products with insufficient transparency and scratch resistance. The amount of the oxide particles ($A_1$) used in the raw materials for preparing the crosslinkable particles is preferably from 5–99 wt %, and more preferably from 10–98 wt %.

The method for preparing the crosslinkable particles will now be described in more detail for the case where the alkoxysilane compound shown by the following formula (2) is used as a silanol group-forming compound.

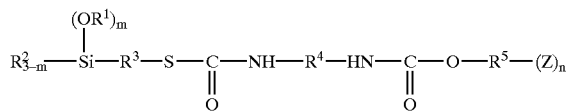

(2)

wherein $R^1$ and $R^2$ individually represent a hydrogen atom or an alkyl group or aryl group having 1–8 carbon atoms;

m represents 1, 2, or 3;

$R^3$ represents a divalent organic group having a $C_1$–$C_{12}$ aliphatic or aromatic structure which may include a linear, branched, or cyclic structure;

$R^4$ represents a divalent organic group;

$R^5$ represents an organic group of an (n+1) valence;

Z is a monovalent organic group having a polymerizable unsaturated group in the molecule which causes an intermolecular cross-linking reaction in the presence of active radicals; and n represents an integer from 1 to 20.

The amount of water consumed in the hydrolysis of the alkoxysilane compound in the preparation of the crosslinkable particles may be the amount sufficient to hydrolyze at least one alkoxy group on the silicon atom in one molecule. Preferably, the amount of water which is added or present during the hydrolysis reaction is one third (⅓) or more of the number of mols of the total alkoxy groups on the silicon atoms of the alkoxysilane compound, with particularly preferable amount being from ½ to 3 times of the number of mols of the total alkoxy groups. The product obtained by mixing the alkoxysilane compound and the oxide particles ($A_1$) under the conditions where no moisture is present is a product wherein the alkoxysilane compound has physically absorbed on the surface of oxide particles ($A_1$). The cured products made from the composition which includes such crosslinkable particles can exhibit only insufficient hardness and scratch resistance.

The methods which can be selected for the preparation of crosslinkable particles (A) include a method of separately hydrolyzing the above-mentioned alkoxysilane compound, and mixing the hydrolyzed product with a powder of oxide particles or a solvent dispersion sol of oxide particles with heating and stirring; a method of carrying out the hydrolysis of the alkoxysilane compound in the presence of the oxide particles; and a method of treating the surface of the oxide particles in the presence of, for example, (D) the polymerization initiator and the like. Among these, the method of hydrolyzing the alkoxysilane compound in the presence of oxide particles is preferable. The treatment for the preparation of the crosslinkable particles (A) is carried out at a temperature from 0 to 150° C., preferably from 20 to 100° C. The treating time is usually from 5 minutes to 24 hours.

When oxide particles in the form of a powder are used in the preparation of the crosslinkable particles (A), an organic solvent may be added to ensure a smooth and homogeneous reaction with the alkoxysilane compound. The same solvents as used as the above-mentioned dispersion medium for the solvent dispersion sol of oxide particles can be used as such an organic solvent. There are no specific limitations to the types of these solvents, in as much as a smooth and homogeneous reaction is ensured.

When a solvent dispersion sol is used as the raw material for the crosslinkable particles (A), the crosslinkable particles (A) can be prepared by a process comprising at least a step of mixing the solvent dispersion sol and the specific organic compound. Here, an organic solvent which is mutually soluble with water can be added to ensure homogeneity in the initial stage of the reaction and smooth reaction.

Moreover, an acid, salt, or base may be added as a catalyst to accelerate the reaction to produce the crosslinkable particles (A). Given as examples of the acid are inorganic acids such as hydrochloric acid, nitric acid, sulfuric acid, and phosphoric acid, organic acids such as methanesulfonic acid, toluenesulfonic acid, phthalic acid, malonic acid, formic acid, acetic acid, and oxalic acid, as well as unsaturated organic acids such as methacrylic acid, acrylic acid, and itaconic acid. As examples of the salt, ammonium salts such as tetramethylammonium chloride and tetrabutylammonium chloride can be given. Given as examples of the base, aqueous ammonia; primary, secondary, or tertiary aliphatic amines such as diethylamine, triethylamine, dibutylamine, and cyclohexylamine; aromatic amines such as pyridine; sodium hydroxide, potassium hydroxide; as well as tertiary ammonium hydroxides such as tetramethylammonium hydroxide, tetrabutylammonium hydroxide, and the like. Among these, preferable catalysts are acids such as organic acids and unsaturated organic acids, and bases such as tertiary amines and quaternary ammonium hydroxide. The amount of these acids, salts, or bases to be added is preferably from 0.001 to 1.0 part by weight, and more preferably from 0.01 to 0.1 part by weight, for 100 parts by weight of the alkoxysilane compounds.

Preferably, a dehydrating agent is added to promote the reaction. As a dehydrating agent, inorganic compounds such as zeolite, anhydrous silica, and anhydrous alumina, and organic compounds such as methyl orthoformate, ethyl orthoformate, tetraethoxymethane, and tetrabutoxymethane can be used. Of these, the organic compounds are preferred, with ortho esters such as methyl orthoformate, ethyl orthoformate being particular preferred. The amount of alkoxysilane compound bonded with the crosslinkable particles (A) can be determined as a weight loss (%) when a dry powder is burnt completely in air in a thermogravimetric analysis from 110 to 800° C.

When present, the compositions preferably comprise at least 20 wt %, relative to the total weight of the composition, of the component comprised of a metal oxide bonded to an organic compound, more preferably at least 35 wt %. The present compositions preferably comprise less than 95 wt %, more preferably less than 85 wt %, of the component comprised of a metal oxide bonded to an organic compound.

In lieu of, or in addition to, the above metal oxides having a radiation-curable group, the present compositions may comprise non-radiation-curable metal oxides, for instance non-acrylated colloidal silica. Preferably, the non-radiation-curable metal oxides have a particle size in the range of 5–100 nm, for instance 10–75 nm, 10–50 nm, or 10–20 nm. In one embodiment, it is preferred to add non-radiation-curable colloidal silica to the composition as a liquid suspension of non-acrylated colloidal silica particles in an organic medium. Preferred organic media include acrylate-functional organic media such as, for instance, tripropyleneglycol diacrylate and hexanediol diacrylate. Commercial examples of suspensions of non-radiation-curable colloidal silica particles include the Highlink® series from Clariant Corporation.

Preferably, the present compositions comprise at least one poly(meth)acrylate monomer, i.e. a monomer comprising at least two acrylate or methacrylate groups, and more preferably at least two poly(meth)acrylate monomers. Preferably the compositions comprise at least one, more preferably at least two, poly(meth)acrylate monomers having at least three (meth)acrylate groups.

The poly(meth)acrylates may be alkoxylated, for instance ethoxylated or propoxylated. Preferably the composition comprises a tri(meth)acrylate, more preferably an alkoxylated tri(meth)acrylate, most preferably an ethoxylated tri(meth)acrylate. An example of a preferred ethoxylated tri(meth)acrylate is, for instance, ethoxylated trimethylolpropane triacrylate. Commercial examples of ethoxylated trimethylol propane triacrylate include SR 502 from Sartomer, which is an ethoxylated (9) trimethylol propane triacrylate. Examples of non-alkoxylated tri(meth) acrylates that can be used in the present invention include, for instance, tris (2-hydroxy ethyl) isocyanurate triacrylate, which is commercially available from, for instance, Sartomer as SR-368.

Examples of other preferred poly(meth)acrylate monomers include penta(meth)acrylates. Preferred penta(meth)acrylates include, for instance, dipentaerythritol monohydroxypenta acrylate. Commercial examples of such a pentacrylate include SR-399 from Sartomer. Preferably the compositions of the present invention comprise both a tri(meth)acrylate and a penta(meth)acrylate.

The present compositions may also comprise mono(meth)acrylate monomers as well as other radiation curable monomers such as N-vinyl functional monomers.

Preferably, the present compositions comprise monomers which not only comprise one or more (meth)acrylate groups, but also other functional groups such as one or more hydroxy groups and/or one or more carboxylic acid groups.

Preferably, the present compositions comprise, relative to the total weight of the composition, at least 5 wt % of (meth)acrylate-functional monomers (preferably poly[meth]acrylate monomers), more preferably at least 10 wt %, most preferably at least 15 wt %, such as at least 40 wt %. Generally, the compositions comprise less than 90 wt % of (meth)acrylate functional monomer, for instance less than 70 wt %.

Preferably, the present compositions comprises at least 5 wt %, for instance 5–50 wt %, of a poly(meth)acrylate having at least three (meth)acrylate groups.

Preferably, the present compositions comprise 1–25 wt %, relative to the total weight of the composition, of monomers comprising 3 (meth)acrylate groups, more preferably 5–25 wt %.

Preferably, the present compositions comprise, relative to the total weight of the composition, at least 5 wt % of monomers comprising 5 (meth)acrylate groups, more preferably at least 10 wt %. The compositions generally comprise less than 50 wt % of monomers comprising 5 (meth) acrylate groups, preferably less than 35 wt %, more preferably less than 25 wt %.

If the composition comprises both a penta(meth)acrylate compound and a tri(meth)acrylate compound, the weight ratio of penta(meth)acrylate compounds in the composition to tri(meth)acrylate compounds in the composition is preferably below 5, more preferably below 3, and most preferably below 2.

The (meth)acrylate monomers may be added to the present composition separately or as part of a suspension with the metal oxide particles.

The present compositions preferably comprise an adhesion promoter. Preferred adhesion promoters include silane adhesion promoters, for instance polyalkoxysilanes such as gamma-mercaptopropyltrimethoxysilane and methacryloxypropyl trimethoxy silane. Methacryloxypropyl trimethoxy silane is most preferred, for instance because it tends to have better shelf life than gamma-mercaptopropyl trimethoxy silane. Preferably the present compositions comprise, relative to the total weight of the composition, at least 1 wt % of adhesion promoter, more preferably at least 3 wt %, and most preferably at least 5 wt %. Generally, the present compositions will comprise less than 25 wt % of adhesion promoter.

Although generally not preferred, the present compositions may comprise any suitable epoxy-functional compound. Examples of suitable epoxy-functional compounds include bisphenol A diglycidyl ethers, epoxy novolaks, and cycloaliphatic epoxides. Preferred cycloaliphatic epoxides include those comprising one or more, preferably two, cyclohexene oxide structures, such as 3,4-epoxycyclohexyl-methyl-3,4-epoxycyclohexane carboxylate. Preferably, the present compositions comprise less than 30 wt % of epoxy-functional compounds, more preferably less than 15 wt %, and most preferably the present compositions are absent epoxy-functional compounds.

The present compositions may further comprise several additives, such as one or more photoinitiators (preferably at least two photoinitiators).

The coating thickness of the composition on the substrate, after cure of the composition, is preferably in the range of 1–100 microns, more preferably 5–50 microns.

Preferably, the pencil hardness of the compositions, after cure, is at least B, more preferably at least HB, and most preferably at least H.

Furthermore, a 5–10 micron thick cured layer of the present compositions preferably has a transparency of at least 65% for light having a wavelength of 400 nm, more preferably at least 75%, and most preferably at least 90%.

The present compositions have, after cure, sufficient adhesion to plastic substrates. Preferably the compositions have an adhesion value of at least 1, more preferably at least 3, as measured according to ASTM D3359.

The present compositions are, after cure, sufficiently flexible. Preferably, the compositions exhibit a flexibility such that less than 10 cracks, more preferably less than 5 cracks, and most preferably no cracks, are visible in a 5–10 micron thick cured layer of the composition, wherein the composition is coated on a plastic substrate (length 20 cm, width 5 cm, and thickness 100 microns) and wound around a rod of 3.10 mm diameter with the plastic facing the surface of the rod and, consequently, the coating (cured composition) facing away from the rod.

Preferably, the present compositions have a haze increase after Taber Abrasion (See Example section) of less than 20%, for instance less than 15%, less than 10%, or even less than 7%.

The present compositions may be used as coating compositions. For instance, the present compositions may be used to coat substrates. Suitable substrates to be coated include organic substrates. Organic substrates are preferably polymeric ("plastic") substrates, such as substrates comprising polynorbornene, polyethyleneterephtalate, polymethylmethacrylate, polycarbonate, polyethersulphone, polyimide, fluorene polyester (e.g. a polymer consisting essentially of repeating interpolymerized units derived from 9,9-bis(4-hydroxyphenyl)fluorene and isophthalic acid, terephthalic acid or mixtures thereof), cellulose (e.g. triacetate cellulose), and/or polyethernaphtalene. Particularly preferred substrates include polynorbornene substrates, fluorene polyester substrates, triacetate cellulose substrates, and polyimide substrates.

The substrates may be pre-treated prior to coating with the present compositions. For instance, the substrates may be subjected to corona or high energy treatment. The substrates may also be chemically treated, such as by emulsion application.

Preferably, the substrate comprises functional groups such as hydroxy groups, carboxylic acid groups and/or trialkoxysilane groups such as trimethoxysilane. The presence of such functional groups may improve adhesion of the coating to the substrate.

The following examples are given as particular embodiments of the invention and to demonstrate the practice and advantages thereof. It is to be understood that the examples are given by way of illustration and are not intended to limit the specification or the claims that follow in any manner.

EXAMPLES

Several compositions were prepared by admixing components as set forth in Table 1 below. The amounts in Table 1 are in weight percentages relative to the total weight of the compositions.

The compositions in Table 1 were coated on a polynorbornene substrate sample (Arton®, JSR-Tokyo-Japan) as a 25 micron thick layer and, after evaporation of solvent during 3 minutes at room temperature, cured under air at 1.0 J/cm$^2$ using a Fusion unit equipped with a D lamp. The dimensions of the polynorbornene substrate, before applying the composition, was: length 20 cm, width 5 cm, and thickness 100 microns.

Adhesion was tested according to testing method ASTM D3359, which is herewith incorporated by reference, which uses a rating scale from 0–5, with 5 being the highest adhesion and 0 the lowest.

Flexibility of the coatings was measured by winding the coated polynorbornene substrates around rods of different diameter, with the polynorbornene substrate facing the surface of the rod and, consequently, the coating facing away from the rod, and by subsequently determining the degree of cracking. The results are given in Table 2. The severity of cracks, as determined with the naked eye, is indicated with numerals 0–5, with 0 meaning no cracks were observed and 5 meaning very severe cracking was observed. For instance, the indication 3 means that approximately 10 cracks were observed in the outer coating layer of the fully wound substrate. The indication "-" means that the coating was no longer coherent.

TABLE 1

Examples 1–4

| Ingredients | Example 1 | Example 2 | Example 3 | Example 4 |
|---|---|---|---|---|
| Acrylated MEK-ST (acrylated silica particles in methyl ethyl ketone [30 wt % particles relative to the combined weight of particles and methyl ethyl ketone]) | 75.00 | 75.00 | | |
| Acrylated MT-ST (acrylated silica particles in methanol [30 wt % particles relative to the combined weight of particles and methanol]) | | | 75.00 | 72.00 |
| Dipentaerythritol monohydroxy penta acrylate (SR-399) | 14.30 | | | 13.60 |
| Tris (2-hydroxyethyl) isocyanurate (SR-368) | 9.50 | 22.00 | | |
| Ethoxylated (9) trimethylolpropane triacrylate (SR-502) | | | 22.00 | 9.00 |
| Irgacure 184 photoinitiator (Ciba Geigy) | 1.50 | 1.50 | 1.50 | 1.50 |
| Irgacure 907 photoinitiator (Ciba Geigy) | 0.90 | 1.50 | 1.50 | 0.90 |
| A-189 silane adhesion promoter (gamma-mercaptopropyltrimethoxysilane, Union Carbide) | | | | 3.00 |
| Properties after cure: | | | | |
| Adhesion to polynorbornene (ASTM D3359) | 0 | 0 | 1 | 1 |
| Pencil hardness of coated polynorbornene substrate | HB | HB | 3B | HB |

TABLE 2

Flexibility of coatings according to Example 1–4

| | Rod Diameter (mm) | | | | | |
|---|---|---|---|---|---|---|
| | 6.25 | 5.00 | 3.75 | 3.10 | 2.50 | 1.25 |
| Polynorbornene Substrate | | | | | | |
| Example 1 | 5 | — | — | — | — | — |
| Example 2 | 0 | 0 | 0 | 0 | 0 | 2 |
| Example 3 | 0 | 0 | 0 | 0 | 0 | 0 |
| Example 4 | 0 | 0 | 0 | 0 | 3 | — |

Table 3 shows another formulation according to the present invention.

TABLE 3

| Ingredients | Example 5 |
|---|---|
| Acrylated MT-ST (acrylated silica particles in methanol [30 wt % particles relative to the combined weight of particles and methanol]) | 70.00 |
| Dipentaerythritol monohydroxy penta acrylate (SR-399) | 13.60 |
| Ethoxylated (9) trimethylolpropane triacrylate (SR-502) | 9.00 |
| Irgacure 184 photoinitiator (Ciba Geigy) | 1.50 |
| Irgacure 907 photoinitiator (Ciba Geigy) | 0.90 |
| Methacryloxypropyl trimethoxy silane | 5.00 |

Several compositions were prepared by admixing components as set forth in Table 4 and 5 below (amounts in weight percentage relative to the total weight of the composition). The abrasion resistance of each composition was determined by taber abrasion testing as follows: A 15.2 μm thick layer of composition was applied on a rigid polycarbonate substrate and cured at 1.0 J/cm$^2$ under air atmosphere with UV radiation using a 300W Fusion D lamp. This resulted in a cured film thickness of approximately 7 μm. The cured film was then abraded with a Teledyne Taber Model 505 dual abrasion tester, using CS10F abrader wheels and 500 g weight on each wheel. After completion of 100 abrasion cycles, the abrasion resistance was evaluated by comparing the haze of the sample before abrasion with the haze after abrasion. The haze before and after abrasion was determined with a BYK-Gardner Haze-Gard Plus apparatus.

TABLE 4

| Ingredient | Ex. 6 | Ex. 7 | Ex. 8 | Ex. 9 | Ex. 10 | Ex. 11 |
|---|---|---|---|---|---|---|
| Acrylated Silica in TPGDA[1] | 95 | | 75 | | 75 | |
| Non-Acrylated Silica in TPGDA[2] | | 95 | | 75 | | 75 |
| Dipentaerythritol monohydroxy pentacrylate | | | 23.6 | 23.6 | 13.6 | 13.6 |
| Tris (2-hydroxyethyl) isocyanurate triacrylate | | | | | 9.0 | 9.0 |
| Irgacure 184[3] | 2.5 | 2.5 | 0.7 | 0.7 | 1.5 | 1.5 |
| Irgacure 907[3] | 2.5 | 2.5 | 0.7 | 0.7 | 0.9 | 0.9 |
| Properties | | | | | | |
| Haze increase after taber abrasion (%) | 15.4 | 8.8 | 9.4 | 11.6 | 10.3 | 12.1 |

[1]30 wt % acrylated SiO$_2$ in tripropyleneglycol diacrylate.
[2]30 wt % colloidal SiO$_2$ in tripropyleneglycol diacrylate (Highlink ® OG-108-32 from Clariant Corporation).
[3]Photoinitiator from Ciba Geigy.

TABLE 5

| Ingredient | Ex. 12 | Ex. 13 | Ex. 14 | Ex. 15 | Ex. 16 | Ex. 17 |
|---|---|---|---|---|---|---|
| Acrylated Silica in HDDA[1] | 95 | | 75 | | 75 | |
| Non-Acrylated Silica in HDDA[2] | | 95 | | 75 | | 75 |
| Dipentaerythritol monohydroxy pentacrylate | | | 23.6 | 23.6 | 13.6 | 13.6 |
| Tris (2-hydroxyethyl) isocyanurate triacrylate | | | | | 9.0 | 9.0 |
| Irgacure 184[3] | 2.5 | 2.5 | 0.7 | 0.7 | 1.5 | 1.5 |
| Irgacure 907[3] | 2.5 | 2.5 | 0.7 | 0.7 | 0.9 | 0.9 |
| Properties | | | | | | |
| Haze increase after taber abrasion (%) | 6.6 | 5.8 | 5.8 | 7.3 | 6.5 | 8.8 |

[1]50 wt % acrylated SiO$_2$ in hexanediol diacrylate.
[2]50 wt % colloidal SiO$_2$ in hexanediol diacrylate (Highlink ® OG-113-53 from Clariant Corporation).
[3]Photoinitiator from Ciba Geigy.

Having described specific embodiments of the present invention, it will be understood that many modifications thereof will readily be apparent to those skilled in the art, and it is intended therefore that this invention is limited only by the spirit and scope of the following claims.

What is claimed is:

1. A curable composition for coating a plastic substrate, said composition consisting essentially of:
   (a) metal oxide particles;
   (b) one or more poly(meth)acrylate compounds;
   (c) one or more photoinitiators;
   (d) optionally, mono(meth)acrylate monomers or N-vinyl functional monomers;
   (e) optionally, silane adhesion promoters; and
   (f) optionally, epoxy-functional compounds; wherein said composition, after cure, has a haze increase after taber abrasion of less than 20%.

2. The composition of claim 1, wherein said metal oxide particles include metal oxide particles bonded to an organic compound, said organic compound having
   (i) a radiation curable group; and
   (ii) a group represented by the following formula (1)

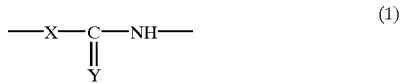

wherein
   X represents an amine (NH), oxygen (O), or sulfur (S) radical; and
   Y represents an oxygen (O), or sulfur (S) radical 3. The composition of claim 1, wherein said plastic substrate comprises at least one plastic selected from the group consisting of polynorbornene, polyethyleneterephtalate, polymethylmethacrylate, polycarbonate, polyethersulphone, polyimide, cellulose, fluorene polyester, and polyethernaphtalene.

4. The composition according to claim 1, wherein said plastic substrate comprises at least one polymer selected from the group consisting of polynorbornene, triacetate cellulose, and fluorene polyester.

5. The composition according to claim 1, wherein said metal oxide particles comprise at least one metal selected from the group consisting of silicon, aluminum, zirconium, titanium, zinc, germanium, indium, tin, antimony, and cerium.

6. The composition according to claim 1, wherein said metal oxide particles include both particles having a radiation-curable group and particles absent a radiation-curable group.

7. The composition according to claim 1, wherein said composition comprises, relative to the total weight of the composition, 20–95 wt % of metal oxide particles.

8. The composition according to claim 1, wherein said composition comprises, relative to the total weight of the composition, at least 35 wt % of said metal oxide particles.

9. The composition according to claim 1, wherein said one or more poly(meth)acrylate compounds comprise at least three (meth)acrylate groups.

10. The composition according to claim 1, wherein said composition comprises 5–50 wt %, relative to the total weight of the composition, of a poly(meth)acrylate comprising at least three (meth)acrylate groups.

11. The composition according to claim 1, wherein said composition comprises at least two compounds having at least three (meth)acrylate groups.

12. The composition according to claim 1, wherein said composition comprises an ethoxylated triacrylate.

13. The composition according to claim 1, wherein said composition comprises a pentacrylate.

14. The composition of claim 13, wherein said composition comprises less than 35 wt %, relative to the total weight of the composition, of said pentacrylate.

15. The composition of claim 1, wherein said composition comprises a silane adhesion promoter.

16. The composition according to claim 15, wherein said adhesion promoter is selected from the group consisting of gamma-mercaptopropyl trimethoxysilane and methacryloxypropyl trimethoxy silane.

17. The composition according to claim 15, wherein said composition comprises at least 3 wt %, relative to the total weight of the composition, of said adhesion promoter.

18. The composition according to claim 1, wherein said composition comprises at least 5 wt %, relative to the total weight of the composition, of said adhesion promoter.

19. The composition according to claim 1, wherein said composition (comprises a poly(meth)acrylate compound having one or more hydroxy groups and/or carboxylic groups.

20. The composition according to claim 1, wherein said composition is absent of epoxy-functional compounds.

21. The composition according to claim 1, wherein the pencil hardness of the composition, after cure, is at least HB.

22. The composition according to claim 1, wherein a 5–10 micron thick cured layer of said composition has a transparency of at least 65% for light having a wavelength of 400 nm.

23. The composition according to claim 1, wherein the composition exhibits a flexibility such that less than 10 cracks are visible in a 5–10 micron thick cured layer of the composition when the composition is coated on said plastic substrate (length 20 cm, width 5 cm, and thickness 100 microns) and wound around a rod of 3.10 mm diameter with the plastic facing the surface of the rod and, consequently, the cured layer facing away from the rod.

24. The composition according to claim 1, wherein the composition, after cure, has an adhesion value of at least 1 as measured according to ASTM D3359.

25. An article comprising
   (a) a substrate comprising at least one plastic selected from the group consisting of polynorbornene, polyethyleneterephtalate, polymethylmethacrylate, polycarbonate, polyethersulphone, polyimide, triacetate cellulose, fluorene polyester, and polyethernaphtalene; and
   (b) a coating on said substrate, said coating being obtained by curing the composition according to claim 1.

26. The article of claim 25, wherein said substrate is corona treated.

27. The article according to claim 25, wherein said article includes an optical display.

28. The article according to claim 25, wherein said article includes a liquid crystal display or an organic light emitting diode display.

29. The article according to claim 25, wherein said article includes an optical disc.

30. A process for preparing a coating, said process comprising curing a composition according to claim 1.

31. A display monitor comprising a plastic substrate coated at least in part with a coating formed by curing a composition according to claim 1.

32. The display monitor of claim 31 wherein an image is viewed through said coating.

* * * * *

UNITED STATES PATENT AND TRADEMARK OFFICE
CERTIFICATE OF CORRECTION

PATENT NO.   : 6,646,080 B2
DATED        : November 11, 2003
INVENTOR(S)  : Chawla et al.

It is certified that error appears in the above-identified patent and that said Letters Patent is hereby corrected as shown below:

<u>Title page,</u>
Item [75], Inventors, should read -- Chander P. Chawla, Batavia, IL; Christopher Tronche, Schaumburg, IL --

Signed and Sealed this

Sixth Day of April, 2004

JON W. DUDAS
*Acting Director of the United States Patent and Trademark Office*